United States Patent
Kawano et al.

(10) Patent No.: US 9,641,056 B2
(45) Date of Patent: May 2, 2017

(54) CONDUCTIVE WIRE PIECE SUPPLY METHOD AND CONDUCTIVE WIRE PIECE SUPPLY DEVICE

(71) Applicant: HONDA MOTOR CO., LTD., Tokyo (JP)

(72) Inventors: Shinichi Kawano, Tochigi (JP); Kenichi Ohno, Tochigi (JP); Daisuke Ueno, Tochigi (JP); Kanomi Hayashi, Tochigi (JP); Satoru Saito, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 324 days.

(21) Appl. No.: 14/465,425

(22) Filed: Aug. 21, 2014

(65) Prior Publication Data
US 2015/0056054 A1 Feb. 26, 2015

(30) Foreign Application Priority Data

Aug. 26, 2013 (JP) .................... 2013-174946

(51) Int. Cl.
*B65G 57/00* (2006.01)
*H02K 15/04* (2006.01)

(52) U.S. Cl.
CPC ......... *H02K 15/0414* (2013.01); *B65G 57/00* (2013.01); *H02K 15/0421* (2013.01)

(58) Field of Classification Search
CPC ........ B65G 57/00; B65G 57/02; B65G 57/08; B65G 57/18; B65G 57/305; H02K 15/0414; H02K 15/0421
USPC ............................................ 414/788.6, 788.9
See application file for complete search history.

(56) References Cited

FOREIGN PATENT DOCUMENTS

| JP | 61012516 A | * | 1/1986 |
|---|---|---|---|
| JP | 3894004 | | 12/2006 |
| JP | 2012-165624 | | 8/2012 |

OTHER PUBLICATIONS

Machine Translation of JP 61012516 A, Jan. 20, 1986, translation obtained on Sep. 1, 2016, 2 pages.*

* cited by examiner

*Primary Examiner* — Teresa M Ekiert
(74) *Attorney, Agent, or Firm* — Rankin, Hill & Clark LLP (57) ABSTRACT

A conductive wire piece supply method includes the steps of: obtaining a conductive wire piece set using a first slot which receives conductive wire pieces, having been sent, with the conductive wire pieces vertically superposed on each other; carrying the conductive wire piece set from the first slot portion to the second slot portion; and rotating the second slot portion.

4 Claims, 5 Drawing Sheets

CONDUCTIVE WIRE PIECE SUPPLY METHOD AND CONDUCTIVE WIRE PIECE SUPPLY DEVICE

BACKGROUND OF THE INVENTION

1. Field of the Invention

The present invention relates to a conductive wire piece supply method and a conductive wire piece supply device for supplying a receiving unit with conductive wire pieces each having a rectangular cross section and sent from a sending unit.

2. Description of the Related Art

Conventionally, this type of conductive wire piece is obtained by cutting a rectangular wire having a rectangular cross section in a conductive wire piece manufacturing device as a sending unit. Then, the obtained conductive wire piece is supplied to a forming device as a receiving unit and formed in a substantially U shape. The formed conductive wire piece is used to shape a stator coil.

In the shaping, many conductive wire pieces are annularly aligned with U-shaped central portions thereof superposed and the conductive wire pieces are inserted into slots of a stator core from both end sides of the U shape. Thereby, the ends of the respective conductive wire pieces project from the respective slots. Then, the projecting ends of the conductive wire pieces are joined to each other, by which a stator coil is made (for example, refer to Patent Document 1).

In addition, as this type of conductive wire piece, there is known one formed in such a way that each conductive wire piece set made of a plurality of conductive wire pieces superposed on each other is formed in a U shape (Refer to Patent Document 2). The formed conductive wire piece sets are annularly arranged so as to be partially superposed and inserted into slots of a stator core from both end sides. Furthermore, the end sides of the conductive wire pieces projecting from the slots are folded and the ends corresponding to each other are joined together, by which a stator coil is made.

CITATION LIST

Patent Documents

[Patent Document 1] Japanese Patent No. 3894004
[Patent Document 2] Japanese Patent Application Laid-Open No. 2012-165624

In the case where conductive wire pieces are formed in units of a conductive wire piece set as described in Patent Document 2 in the above, an important issue is the posture of the conductive wire piece set taken when it is supplied to the forming device, unlike the case of formation in units of a single conductive wire piece as described in Patent Document 1. Specifically, a conductive wire piece sent from the sending unit has a predetermined length, width, and thickness and is sent with a posture in which the thickness direction coincides with the vertical direction. In addition, the conductive wire piece set composed of these conductive wire pieces needs to be supplied to the forming device with a posture in which the width direction of the conductive wire pieces coincides with the vertical direction.

It is, however, difficult to make a device which superposes a predetermined number of conductive wire pieces, which have been sent one by one from the sending unit with a posture in which the thickness direction coincides with the vertical direction, on each other in the thickness direction in a state where the width direction coincides with the vertical direction in order to obtain the conductive wire piece set having the above posture. Moreover, obtaining a conductive wire piece set by superposing conductive wire pieces on each other by hand results in reduction in productivity.

It is therefore an object of the present invention to provide a simple and efficient conductive wire piece supply method and conductive wire piece supply device capable of supplying a receiving unit with conductive wire pieces, which have been sent from a sending unit, as a conductive wire piece set having an appropriate posture.

SUMMARY OF THE INVENTION

According to an aspect of the present invention, there is provided a conductive wire piece supply method for supplying a receiving unit with a conductive wire piece with a rectangular cross section having a predetermined length, width, and thickness, which is sent from a sending unit, the method comprising: an arrangement step of arranging a first slot portion at a position where the sending unit sequentially sends the conductive wire pieces one by one with a posture in which a thickness direction coincides with a vertical direction and a length direction coincides with a sending direction; a superposing step in which the first slot portion arranged in the arrangement step receives the conductive wire pieces sent from the sending unit by a predetermined number in such a way that the conductive wire pieces are superposed in the thickness direction to obtain a conductive wire piece set including the predetermined number of conductive wire pieces; a carrying step of carrying the conductive wire piece set obtained in the superposing step from the first slot portion to a second slot portion; and a rotation step of rotating the second slot portion, to which the conductive wire piece set is carried, about a rotation axis line parallel to the second slot portion by a rotation angle so that the conductive wire piece set has a posture corresponding to the receiving unit.

According to the present invention, the first slot portion only needs to receive the conductive wire pieces sent from the sending unit, thereby enabling the superposition of the conductive wire pieces. Thereby, a conductive wire piece set is able to be obtained stably at a speed corresponding to the sending speed of the conductive wire pieces from the sending unit.

Moreover, the obtained conductive wire piece set is carried to the second slot portion and then the rotating part rotates the second slot portion, by which the conductive wire piece set has a posture corresponding to the receiving unit. This enables the conductive wire piece set to be supplied to the receiving unit from the second slot portion without changing the posture.

Therefore, according to the present invention, the receiving unit can be simply and efficiently supplied with the conductive wire pieces sent from the sending unit as a conductive wire piece set with an appropriate posture.

In the present invention, the superposing step and the carrying step may be performed while keeping an angle of the conductive wire pieces formed with respect to the vertical direction obtained when the conductive wire pieces are sent from the sending unit and the rotation angle in the rotation step may be 90°.

According thereto, the receiving unit can be supplied with the conductive wire pieces sent from the sending unit with a posture in which the thickness direction coincides with the vertical direction as a conductive wire piece set with a posture in which the width direction of the conductive wire pieces coincides with the vertical direction.

According to another aspect of the present invention, there is provided a conductive wire piece supply device which receives conductive wire pieces each with a rectangular cross section and having a predetermined length, width, and thickness, which is sent from a sending unit, and supplies a receiving unit with the conductive wire pieces, the device comprising: a first slot portion which is arranged at a position where the sending unit sequentially sends the conductive wire pieces one by one with a posture in which a thickness direction coincides with a vertical direction and a length direction coincides with a sending direction, and receives the conductive wire pieces by a predetermined number in such a way that the conductive wire pieces are superposed in the thickness direction to obtain a conductive wire piece set including the predetermined number of conductive wire pieces; a second slot portion to which the conductive wire piece set is carried from the first slot portion; a carrying unit which carries the conductive wire piece set; and a rotating part which rotates the second slot portion, to which the conductive wire piece set is carried, about a rotation axis line parallel to the second slot portion by an angle so that the conductive wire piece set has a posture corresponding to the receiving unit.

According to the conductive wire piece supply device of the present invention, similarly to the conductive wire piece supply method of the present invention described above, the receiving unit can be simply and efficiently supplied with the conductive wire pieces sent from the sending unit as a conductive wire piece set with an appropriate posture.

In the conductive wire piece supply device according to the present invention, when the conductive wire piece set is carried to the second slot portion, the conductive wire pieces constituting the conductive wire piece set may maintain an angle formed with respect to the vertical direction obtained when the conductive wire pieces are sent from the sending unit and the rotation angle of the rotating part may be 90°.

According thereto, the receiving unit can be supplied with the conductive wire pieces sent from the sending unit with a posture in which the thickness direction coincides with the vertical direction as a conductive wire piece set with a posture in which the width direction of the conductive wire pieces coincides with the vertical direction.

DESCRIPTION OF THE PREFERRED EMBODIMENTS

Figure 1:
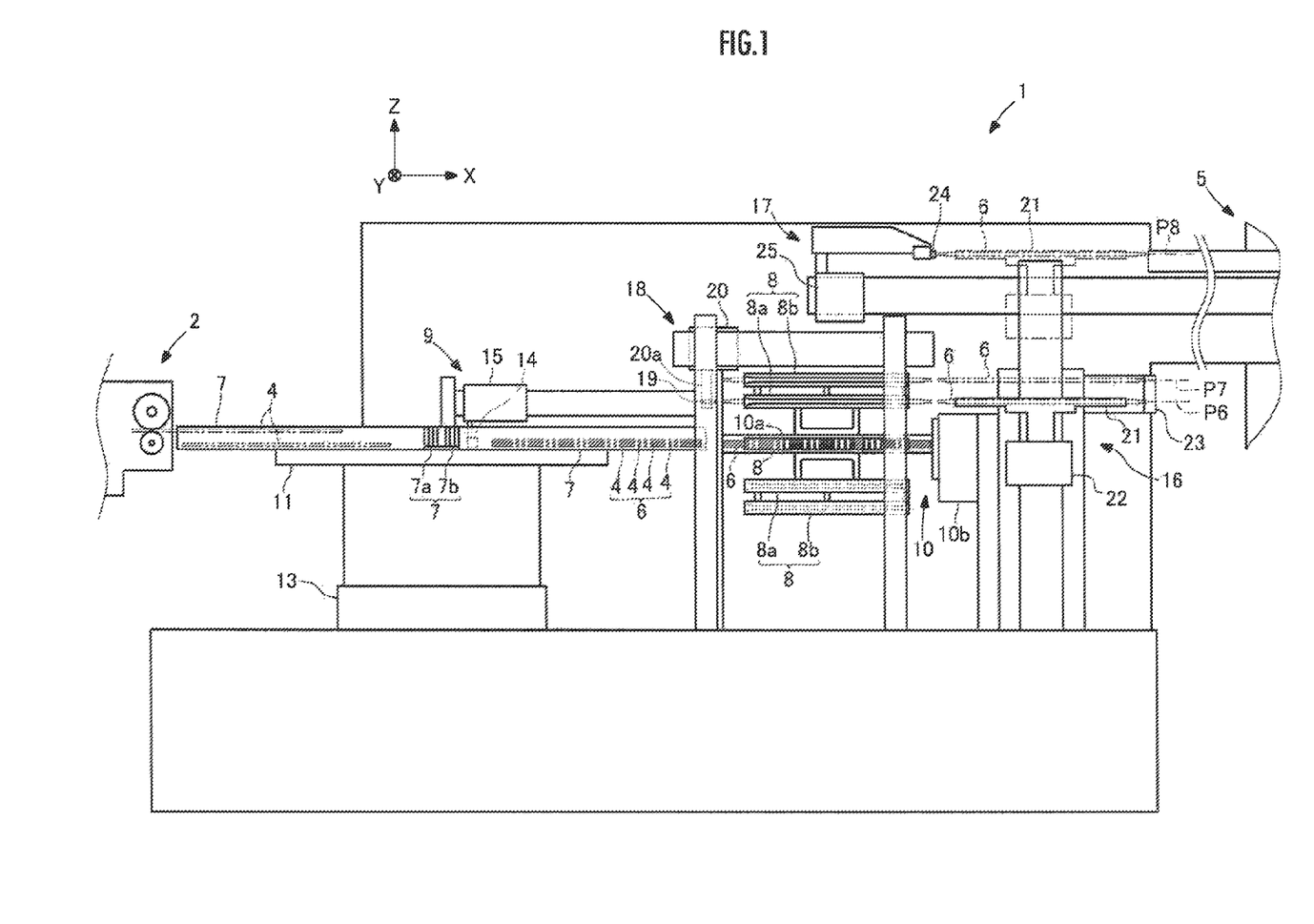
FIG. 1 is a front view of a conductive wire piece supply device according to one embodiment of the present invention.
Figure 2:
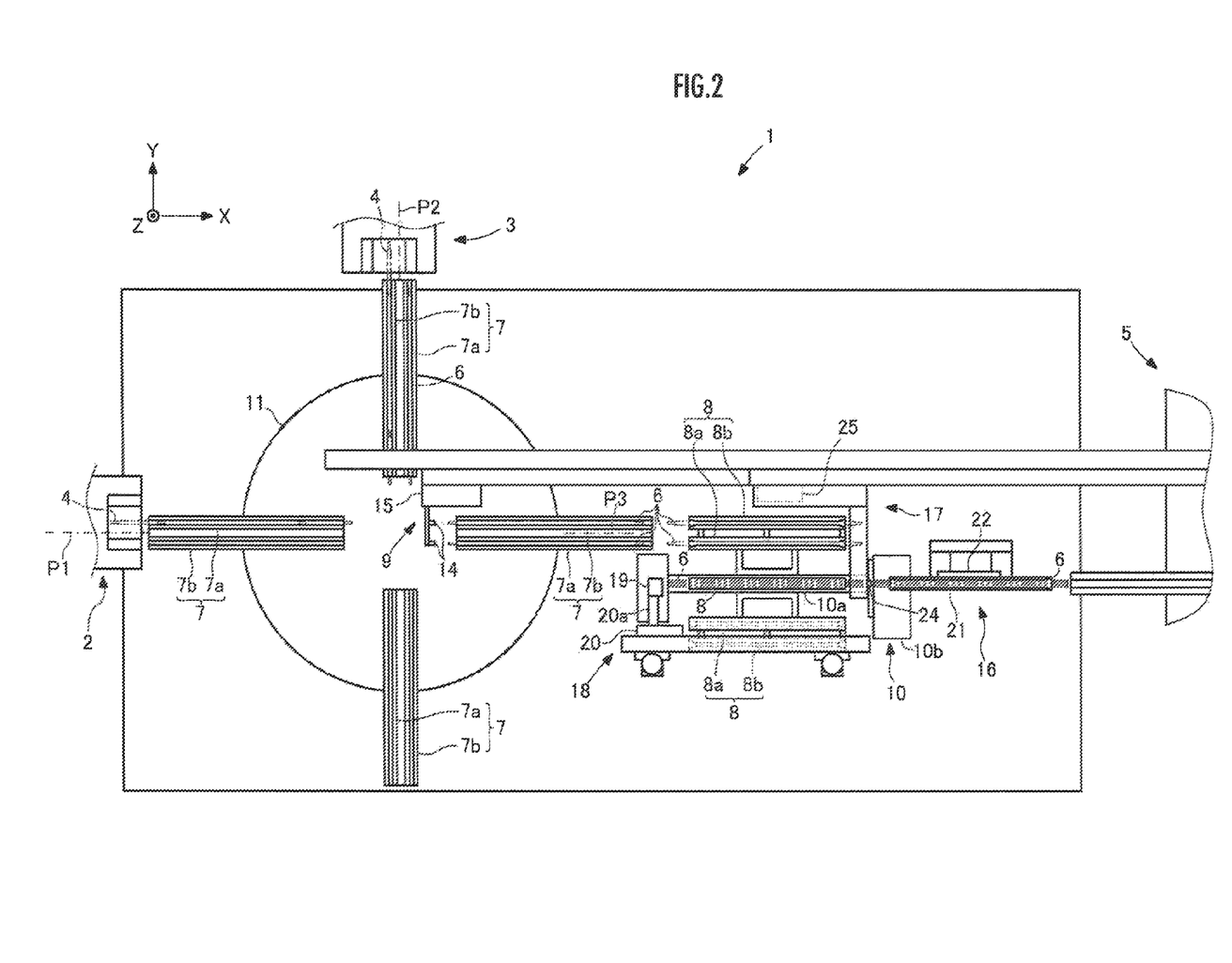
FIG. 2 is a top view of the conductive wire piece supply device in FIG. 1.

Hereinafter, the embodiment of the present invention will be described by using appended drawings. As illustrated in FIGS. 1 and 2, a conductive wire piece supply device 1 of this embodiment receives conductive wire pieces 4 sent from two conductive wire piece manufacturing devices 2 and 3 as sending units and supplies the conductive wire pieces 4 to a forming device 5 as a receiving unit.

The conductive wire pieces 4 are manufactured in the conductive wire piece manufacturing devices 2 and 3 by cutting a rectangular wire coated with insulation coating by a predetermined length. Therefore, the conductive wire piece 4 has a rectangular cross section with two surfaces on the long-side side and two surfaces on the short-side side. A direction perpendicular to the two surfaces on the long-side side is a thickness direction, and a direction perpendicular to the two surfaces on the short-side side is a width direction of the conductive wire piece 4. The insulation coating is removed from both ends of each conductive wire piece 4.

The conductive wire pieces 4 are sequentially sent one by one from both the conductive wire piece manufacturing devices 2 and 3 to the conductive wire piece supply device 1. When the XYZ axes of the right-hand system is defined as illustrated in FIG. 1, the sending of the conductive wire piece 4 from the conductive wire piece manufacturing device 2 is performed in the positive direction of the X axis with a posture in which the length direction of the conductive wire piece 4 coincides with the X-axis direction and the width direction of the conductive wire piece 4 coincides with the Y-axis direction. In addition, the XY plane is horizontal and the positive direction of the Z axis coincides with the vertically upward direction.

The sending of the conductive wire piece 4 from the conductive wire piece manufacturing device 3 is performed in the negative direction of the Y axis with a posture in which the length direction of the conductive wire piece 4 coincides with the Y-axis direction and the width direction of the conductive wire piece 4 coincides with the X-axis direction. In either case where the conductive wire pieces 4 are sent from the conductive wire piece manufacturing device 2 or 3, the sent conductive wire pieces 4 are received so as to be superposed on each other in units of four pieces by the conductive wire piece supply device 1.

Figure 3A:
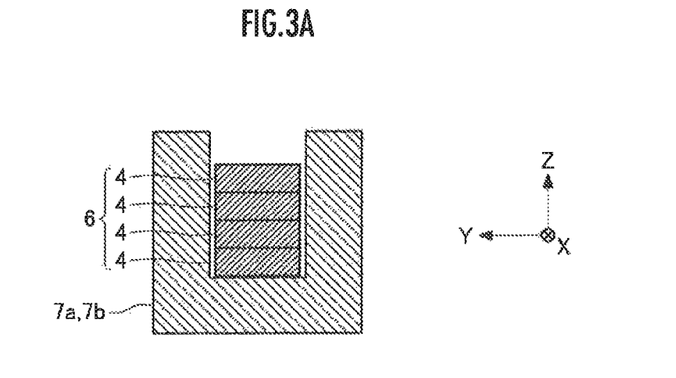
FIG. 3A is a diagram illustrating a state of a conductive wire piece set before posture change obtained in the conductive wire piece supply device in FIG. 1, viewed from the end side.
Figure 3B:
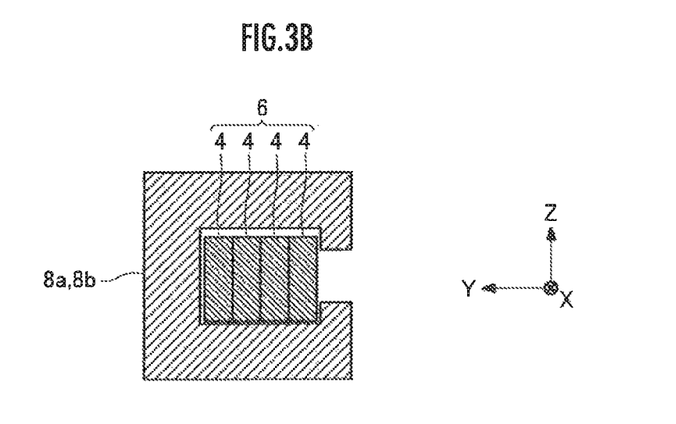
FIG. 3B is a diagram illustrating a state of the conductive wire piece set after the posture change, viewed from the end side.

As illustrated in FIG. 3A, the four conductive wire pieces 4 superposed on each other, namely a conductive wire piece set 6 has a posture in which the thickness direction of the conductive wire pieces 4 coincides with the Z-axis direction (vertical direction). Then, as illustrated in FIG. 3B, the posture is changed to one in which the width direction of the conductive wire pieces 4 coincide with the Z-axis direction and the conductive wire piece set 6 is supplied to the forming device 5. The conductive wire piece set 6 supplied to the forming device 5 is formed in an substantially U shape in the forming device 5 so as to be supplied for shaping a stator coil.

As illustrated in FIGS. 1 and 2, the conductive wire piece supply device 1 includes, as main components, four first slot pairs 7 for receiving the conductive wire pieces 4 from the conductive wire piece manufacturing devices 2 and 3, four second slot pairs 8 corresponding to the first slot pairs 7, a carrying unit 9 which carries the conductive wire piece sets 6 in the respective first slot pairs 7 to the corresponding second slot pairs 8, and a rotating part 10 which rotates the second slot pairs 8.

Each first slot pair 7 is composed of two first slot portions 7a and 7b in parallel with and adjacent to each other. The first slot portions 7a and 7b each have a slot groove with an opened tip side for accepting a conductive wire piece 4. The acceptance of the conductive wire piece 4 is performed from the tip side of the first slot portions 7a and 7b.

The first slot pair 7 is arranged on a rotary table 11 where the table surface is parallel to the XY plane. The respective first slot pairs 7 extend along the radial direction of the rotary table 11 and form an angle of 90° relative to each other. The ends of the first slot portions 7a and 7b on the radially outer side (tip side) of the rotary table 11 are located on the same circumference around the rotation axis line of the rotary table 11.

The first slot portion 7a sequentially accepts conductive wire pieces 4 while being superposed on each other in a sending position where the conductive wire pieces 4 are sent one by one from the conductive wire piece manufacturing device 2, by which a conductive wire piece set 6 composed of four conductive wire pieces 4 is shaped.

Moreover, the first slot portion 7b sequentially accepts conductive wire pieces 4 while being superposed on each other in a sending position where the conductive wire pieces 4 are sent one by one from the conductive wire piece manufacturing device 3, by which a conductive wire piece set 6 composed of four conductive wire pieces 4 is shaped. FIG. 3A illustrates a cross section of the conductive wire pieces 4 shaped in the first slot portion 7a or 7b in this manner.

Beneath the rotary table 11, there is provided a rotary drive unit 13 which rotates the rotary table 11 about the rotation axis line thereof in the vertical direction. The rotary drive unit 13 rotates the rotary table 11 at 90° intervals so that the respective first slot pairs 7 are sequentially located so as to be parallel to the X axis and at a first position P1 facing to the conductive wire piece manufacturing device 2.

The direction of the rotation is a direction in which a right-hand screw rotates in advancing in the negative direction of the Z axis. Moreover, this rotation causes the respective first slot pairs 7 to be sequentially located so as to be parallel to the Y axis and at a second position P2 facing to the conductive wire piece manufacturing device 3. Furthermore, the rotation causes the respective first slot pairs 7 to be sequentially located at a third position P3 opposite to the first position P1 on the rotary table 11.

One conductive wire piece manufacturing device 2 is arranged at a position where it can send the conductive wire pieces 4 to the first slot portion 7a of the first slot pair 7 located at the first position P1. Moreover, the other conductive wire piece manufacturing device 3 is arranged at a position where it can sequentially send the conductive wire pieces 4 to the first slot portion 7b of the first slot pair 7 located at the second position P2.

Each second slot pair 8 is composed of second slot portions 8a and 8b parallel to each other. The second slot portions 8a and 8b each have a slot groove opened at both ends for accepting each conductive wire piece set 6.

The distance between the slot grooves of the second slot portions 8a and 8b of the second slot pair 8 is the same as the distance between the slot grooves of the first slot portions 7a and 7b of the first slot pair 7. Conductive wire piece sets 6 are carried to the second slot portions 8a and 8b of each second slot pair 8 from the first slot portions 7a and 7b of the corresponding first slot pair 7.

Figure 4:
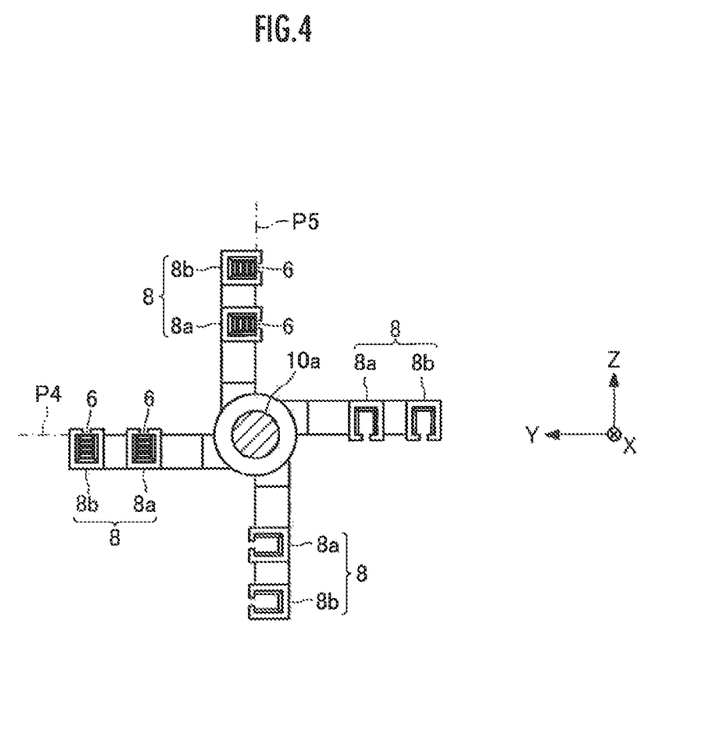
FIG. 4 is a diagram of second slot pairs and a rotating shaft supporting them in the conductive wire piece supply device of FIG. 1, viewed from the X-axis negative direction side.

The rotating part 10 includes a rotating shaft 10a which supports the four second slot pairs 8 and a drive means 10b which rotates the rotating shaft 10a. As illustrated in FIG. 4, the rotating shaft 10a supports the four second slot pairs 8 so as to be parallel to the rotating shaft 10a and in the positions equally spaced from the rotating shaft 10a at equal intervals (at 90° intervals with respect to the central angle about the center axis line of the rotating shaft 10a).

The second slot portions 8a and 8b of each second slot pair 8 are arranged so that the second slot portion 8a is located closer to the center axis line than the second slot portion 8b on a plane parallel to the plane including the center axis line of the rotating shaft 10a.

The rotating part 10 rotates four second slot pairs 8 at 90° intervals. The rotation direction is a direction in which a right-hand screw rotates in advancing in the positive direction of the X axis. Thereby, as illustrated in FIG. 4, the respective second slot pairs 8 rotate about the rotating shaft 10a so as to be sequentially located at a fourth position P4 which is a position in the positive direction of the Y axis relative to the center axis line of the rotating shaft 10a and at a fifth position P5 which is a position further rotated by 90° from the fourth position P4.

As illustrated in FIG. 2, the position of the rotating part 10 is determined so that the second slot pair 8 located at the fourth position P4 and the first slot pair 7 located at the third position P3 are located on a straight line. The carrying unit 9 includes a first sending member 14 for sending out the conductive wire piece sets 6 in the first slot portions 7a and 7b of the first slot pair 7 located in the third position P3 by pushing the conductive wire piece sets 6 from the negative X-axis direction side and a first stage 15 which supports the first sending member 14 and is moved in the X-axis direction by a linear motor.

The carrying unit 9 is able to insert the conductive wire piece sets 6 in the first slot portions 7a and 7b located at the third position P3 into the second slot portions 8a and 8b of the second slot pair 8 located at the fourth position P4 by moving the first sending member 14 in the first stage 15. FIG. 3B illustrates the cross section of the conductive wire piece 4 carried into the second slot portion 8a or 8b in this manner.

Between the rotating part 10 and the forming device 5, there is provided a lifting unit 16 which receives each of the conductive wire piece sets 6 transferred from the second slot portions 8a and 8b of the second slot pair 8 located at the fifth position P5 (see FIG. 4) and raises the conductive wire piece set 6 up to a predetermined eighth position P8. The conductive wire piece set 6 raised up to the eighth position P8 is supplied to the forming device 5 by a supply unit 17.

The transfer of the conductive wire piece set 6 from the second slot portions 8a and 8b to the lifting unit 16 is performed by a transfer unit 18. The transfer unit 18 includes a second sending member 19 for sending out the conductive wire piece sets 6 in the second slot portions 8a and 8b located at the fifth position P5 by pushing the conductive wire piece sets 6 from the negative X-axis direction side and a second stage 20 which supports the second sending member 19 and is moved in the X-axis direction by the linear motor.

In the second stage 20, there is provided a displacement unit 20a which displaces the second sending member 19 in the Z-axis direction. The displacement unit 20a positions the second sending member 19 in a predetermined upper position or lower position so that the second sending member 19 sends the respective conductive wire piece sets 6 in the second slot portions 8a and 8b to the lifting unit 16 separately at different timings.

Specifically, in the case where the conductive wire piece set 6 in the second slot portion 8a is sent, the second sending member 19 is positioned in the lower position corresponding to the position of the conductive wire piece set 6. In the case where the conductive wire piece set 6 in the second slot portion 8b is sent, the second sending member 19 is positioned in the upper position corresponding to the position of the conductive wire piece set 6.

The lifting unit 16 includes a third slot portion 21 which receives the conductive wire piece set 6 sent from the second slot portion 8a or 8b of the second slot pair 8 located at the fifth position P5 and a third stage 22 which supports the third slot portion 21 and is moved up and down by the linear motor.

The third slot portion 21 is provided with a slot opened at both ends for receiving the conductive wire piece set 6. The lifting unit 16 moves up and down the third stage 22 to position the third slot portion 21 at a sixth position P6, a seventh position P7, or an eighth position P8.

The sixth position P6 is a position where the third slot portion 21 is linearly aligned to the second slot portion 8a of the second slot pair 8 located at the fifth position P5 (see FIG. 4) on the positive X-axis direction side. The seventh position P7 is a position where the third slot portion 21 is linearly aligned to the second slot portion 8b of the second slot pair 8 located at the fifth position P5 on the positive X-axis direction side. The eighth position P8 is a position where the conductive wire piece set 6 is sent from the third slot portion 21 to the forming device 5.

The third slot portion 21 positioned at the sixth position P6 is able to receive the conductive wire piece set 6 sent from the second slot portion 8a of the second slot pair 8 located at the fifth position P5. In addition, the third slot portion 21 positioned at the seventh position P7 is able to receive the conductive wire piece set 6 sent from the second slot portion 8b of the second slot pair 8 located at the fifth position P5.

An abutting member 23 is provided on the positive X-axis direction side of a portion corresponding to the sixth position P6 and the seventh position P7 in the lifting unit 16. When sending the conductive wire piece sets 6 from the second slot portions 8a and 8b to the lifting unit 16, the abutting member 23 abuts on the right ends of the four conductive wire pieces 4 constituting each conductive wire piece set 6 to align the positions of the right ends.

The supply unit 17 includes a third sending member 24 for sending out the conductive wire piece set 6 in the third slot portion 21 positioned at the eighth position P8 by the lifting unit 16 by pushing the conductive wire piece set 6 from the negative X-axis direction side and a fourth stage 25 which supports the third sending member 24 and is moved in the X-axis direction by the linear motor. The supply unit 17 is able to send the conductive wire piece set 6 in the third slot portion 21 to the forming device 5 by moving the third sending member 24 using the fourth stage 25.

Figure 5:
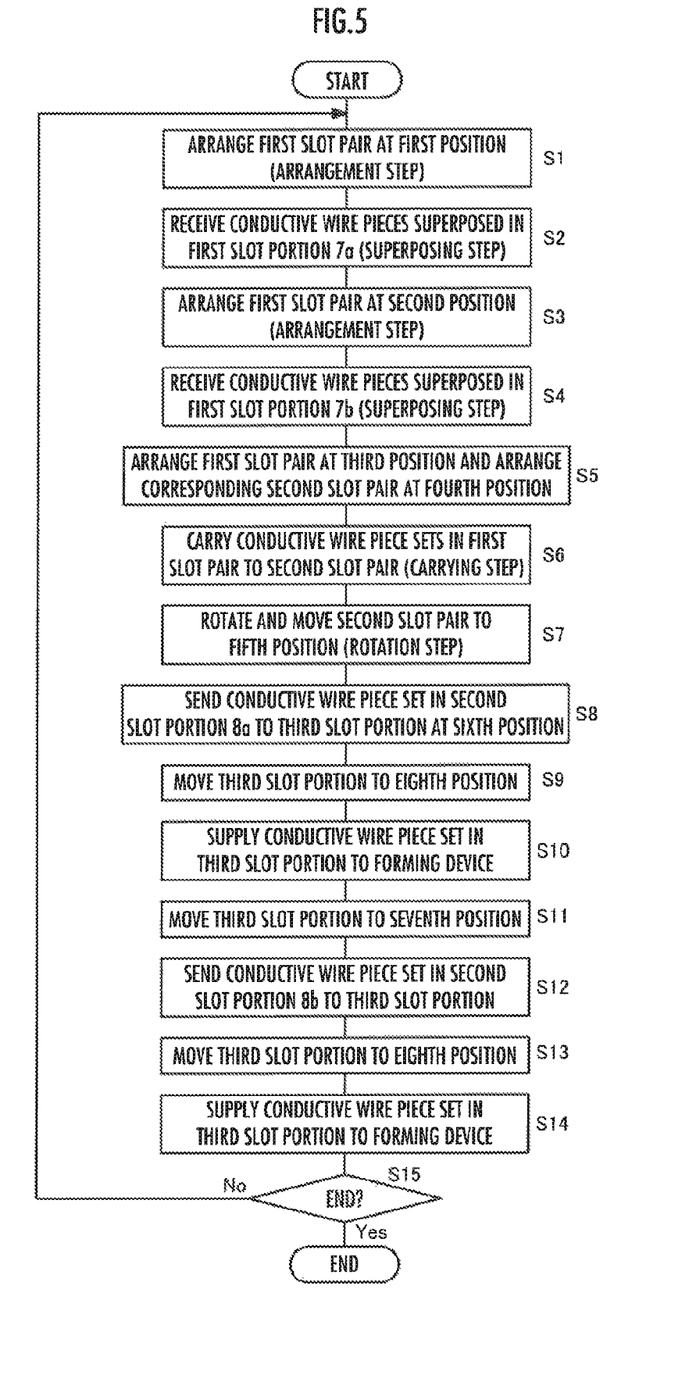
FIG. 5 is a flowchart illustrating an operation of supplying a forming device with conductive wire pieces sent from two conductive wire piece manufacturing devices as a conductive wire piece set by using the conductive wire piece supply device of FIG. 1.

FIG. 5 illustrates a supply operation for supplying the conductive wire piece supply device 1 with the conductive wire pieces 4 sent from the conductive wire piece manufacturing devices 2 and 3 as a conductive wire piece set 6 in the above configuration, with respect to the conductive wire piece set 6 related to one first slot pair 7. In the supply operation, as illustrated in FIG. 5, first, an arrangement step of arranging the first slot pair 7 at the first position P1 is performed by rotating the rotary table 11 using the rotary drive unit 13 (step S1).

This causes the first slot portion 7a of the first slot pair 7 to be arranged at the sending position where the conductive wire pieces 4 are sequentially sent one by one from the conductive wire piece manufacturing device 2. The sent conductive wire pieces 4 each have a posture in which the thickness direction coincides with the vertical direction (Z-axis direction) and the length direction coincides with the sending direction (the positive direction of the X axis). The sending of the conductive wire pieces 4 is performed, for example, at one-second intervals.

Thereafter, a superposing step is performed in which the first slot portion 7a receives the conductive wire pieces 4 sequentially sent from the conductive wire piece manufacturing device 2 only by four pieces so that the four conductive wire pieces 4 are superposed vertically (step S2). Thereby, a conductive wire piece set 6 in which four conductive wire pieces 4 are superposed on each other is obtained in the first slot portion 7a.

Subsequently, an arrangement step is performed to arrange the first slot pair 7 at the second position P2 by rotating the rotary table 11 by 90° (step S3). Thereby, the first slot portion 7b of the first slot pair 7 is arranged at the sending position where the conductive wire pieces 4 are sequentially sent one by one from the conductive wire piece manufacturing device 3.

The sent conductive wire piece 4 has a posture in which the thickness direction coincides with the vertical direction (Z-axis direction) and the length direction coincides with the sending direction (the negative direction of the Y axis). The sending of the conductive wire pieces 4 is performed, for example, at one-second intervals.

Thereafter, a superposing step is performed in which the first slot portion 7b receives the conductive wire pieces 4 sequentially sent from the conductive wire piece manufacturing device 3 only by four pieces so that the four conductive wire pieces 4 are superposed vertically (step S4). Thereby, a conductive wire piece set 6 in which four conductive wire pieces 4 are superposed on each other is obtained also in the first slot portion 7b.

Subsequently, the rotary table 11 is rotated by 90°. Thereby, the first slot pair 7 is located at the third position P3 which is a position on the opposite side of the first position P1 on the rotary table 11. Synchronously with this, the rotating part 10 positions the second slot pair 8 corresponding to the first slot pair 7 at the fourth position P4 (see FIG. 4) (step S5).

Thereafter, a carrying step is performed in which the conductive wire piece sets 6 in the first slot portions 7a and 7b of the first slot pair 7 are carried to the second slot portions 8a and 8b of the second slot pair 8 (step S6). This carrying is performed for both of the conductive wire piece sets 6 in the first slot portions 7a and 7b at the same time by moving the first sending member 14 using the first stage 15 while pushing both of the conductive wire piece sets 6 by the first sending member 14 of the carrying unit 9.

Subsequently, a rotation step is performed in which the rotating part 10 rotates the second slot pair 8 by 90°. Thereby, the second slot pair 8 is positioned at the fifth position P5. In addition, this changes the posture of both of the conductive wire piece sets 6 in the second slot pair 8 so that the width direction of the conductive wire pieces 4 coincides with the vertical direction (step S7).

Subsequently, the transfer unit 18 sends the conductive wire piece set 6 in the second slot portion 8a of the second slot pair 8 to the third slot portion 21 located at the sixth position P6 (step S8). Then, the lifting unit 16 moves the third slot portion 21 from the sixth position P6 to the eighth position P8 (step S9). Thereafter, the supply unit 17 supplies the forming device 5 with the conductive wire piece set 6 in the third slot portion 21 (step S10).

Subsequently, the lifting unit 16 moves the third slot portion 21 from the eighth position P8 to the seventh position P7 (step S11). Then, in steps S12 to S14, the conductive wire piece set 6 in the second slot portion 8b of the second slot pair 8 is sent to the third slot portion 21, moved to the eighth position P8, and supplied to the forming device 5 similarly to steps S8 to S10.

The above operation of steps S1 to S14 is repeated until it is determined that the supply operation in FIG. 5 is ended in step S15. In the above, the supply operation has been described with one first slot pair 7 focused on, with respect to the operation of supplying the forming device 5 with the conductive wire piece sets 6 formed in the one first slot pair 7. The conductive wire piece sets 6 related to the other first slot pair 7 are supplied to the forming device 5 in the same manner.

According to this embodiment, by only the first slot portion 7a or 7b receiving the conductive wire pieces 4 sent from the conductive wire piece manufacturing device 2 or 3, the conductive wire pieces 4 can be superposed on each other. This enables the conductive wire piece set 6 to be obtained stably at a speed corresponding to the sending speed of the conductive wire pieces 4 from the conductive wire piece manufacturing device 2 or 3.

Moreover, the obtained conductive wire piece sets 6 are carried to the second slot portions 8a and 8b and then the rotating part 10 rotates the second slot portions 8a and 8b, by which the conductive wire piece sets 6 each have a posture corresponding to the forming device 5. This enables the conductive wire piece sets 6 to be supplied to the forming device 5 without changing the posture from the second slot portions 8a and 8b. Therefore, the conductive wire piece sets 6 are able to be supplied to the forming device 5 simply and highly efficiently.

Moreover, the rotating part 10 rotates by 90° the conductive wire piece set 6, which is obtained by superposing the conductive wire pieces 4 sequentially sent one by one from the conductive wire piece manufacturing device 2 or 3 with the posture in which the thickness direction coincides with the vertical direction. This enables the conductive wire piece set 6 to be supplied to the forming device 5, as a conductive wire piece set 6 in which the conductive wire pieces 4 are superposed in the thickness direction with the posture in which the width direction of the conductive wire pieces 4 coincides with the vertical direction.

The present invention is not limited to the above embodiment. For example, conductive wire pieces 4 sent from one conductive wire piece manufacturing device may be used, instead of using conductive wire pieces 4 sent from the two conductive wire piece manufacturing devices 2 and 3. In that case, the rotary table 11 or the like may be omitted to simplify the rotating part 10 or the like, though the speed of supplying the forming device 5 with the conductive wire piece sets 6 is reduced.

Moreover, four conductive wire pieces 4 constituting a conductive wire piece set 6 may have different lengths from each other. In this case, the positional relationship in the length direction of the four conductive wire pieces 4 is appropriately adjusted in the conductive wire piece supply device 1 or the forming device 5.

What is claimed is:

1. A conductive wire piece supply method for supplying a receiving unit with conductive wire pieces each with a rectangular cross section and having a predetermined length, width, and thickness, which is sent from a sending unit, the method comprising:

an arrangement step of arranging a first slot portion at a position where the sending unit sequentially sends the conductive wire pieces one by one with a posture in which a thickness direction coincides with a vertical direction and a length direction coincides with a sending direction;

a superposing step in which the first slot portion arranged in the arrangement step receives the conductive wire pieces sent from the sending unit by a predetermined number in such a way that the conductive wire pieces are superposed in the thickness direction to obtain a conductive wire piece set including the predetermined number of conductive wire pieces;

a carrying step of carrying the conductive wire piece set obtained in the superposing step from the first slot portion to a second slot portion; and a rotation step of rotating the second slot portion, to which the conductive wire piece set has been carried, about a rotation axis line parallel to the second slot portion by a rotation angle so that the conductive wire piece set has a posture corresponding to the receiving unit.

2. The conductive wire piece supply method according to claim 1, wherein:

the superposing step and the carrying step are performed while maintaining an angle of the conductive wire pieces formed with respect to the vertical direction obtained when the conductive wire pieces are sent from the sending unit; and the rotation angle in the rotation step is 90°.

3. A conductive wire piece supply device which receives conductive wire pieces each with a rectangular cross section and having a predetermined length, width, and thickness, which is sent from a sending unit, and supplies a receiving unit with the conductive wire pieces, the device comprising:

a first slot portion which is arranged at a position where the sending unit sequentially sends the conductive wire pieces one by one with a posture in which a thickness direction coincides with a vertical direction and a length direction coincides with a sending direction and receives the conductive wire pieces by a predetermined number in such a way that the conductive wire pieces are superposed in the thickness direction to obtain a conductive wire piece set including the predetermined number of conductive wire pieces;

a second slot portion to which the conductive wire piece set is carried from the first slot portion;

a carrying unit which carries the conductive wire piece set; and a rotating part which rotates the second slot portion, to which the conductive wire piece set is carried, about a rotation axis line parallel to the second slot portion by a rotation angle so that the conductive wire piece set has a posture corresponding to the receiving unit while maintaining a laminated state in which the conductive wire pieces are superposed in the thickness direction.

4. The conductive wire piece supply device according to claim 3, wherein:

when the conductive wire piece set is carried to the second slot portion, the conductive wire pieces constituting the conductive wire piece set maintain an angle formed with respect to the vertical direction obtained when the conductive wire pieces are sent from the sending unit; and the rotation angle of the rotating part is 90°.

\* \* \* \* \*